United States Patent

Sato

(10) Patent No.: US 9,975,163 B2
(45) Date of Patent: May 22, 2018

(54) METHOD OF MAKING SHAFT

(71) Applicant: JTEKT CORPORATION, Osaka-shi, Osaka (JP)

(72) Inventor: Yasuhiro Sato, Nagoya (JP)

(73) Assignee: JTEKT CORPORATION, Osaka-shi (JP)

(*) Notice: Subject to any disclaimer, the term of this patent is extended or adjusted under 35 U.S.C. 154(b) by 0 days. days.

(21) Appl. No.: 15/233,385

(22) Filed: Aug. 10, 2016

(65) Prior Publication Data

US 2017/0050228 A1    Feb. 23, 2017

(30) Foreign Application Priority Data

Aug. 20, 2015 (JP) ................ 2015-162437

(51) Int. Cl.
| | |
|---|---|
| B21K 1/06 | (2006.01) |
| B21D 22/28 | (2006.01) |
| F16C 3/02 | (2006.01) |
| B62D 1/185 | (2006.01) |

(52) U.S. Cl.
CPC .............. *B21D 22/28* (2013.01); *B21K 1/066* (2013.01); *B62D 1/185* (2013.01); *F16C 3/02* (2013.01)

(58) Field of Classification Search
CPC .......... B21D 22/28; B21K 1/06; B21K 1/006; B21K 1/106; B21K 1/46; B21J 5/06; B21J 5/08; B21C 1/18; B21C 1/22; B21C 23/01; B21C 25/08
USPC .......................... 72/278, 276, 370.23, 354.6
See application file for complete search history.

(56) References Cited

U.S. PATENT DOCUMENTS 2,027,980 A * 1/1936 Horton ................ B21K 1/46
470/16

FOREIGN PATENT DOCUMENTS

| JP | 2002-035886 A | 2/2002 |
|---|---|---|
| JP | 2003-136180 A | 5/2003 |
| JP | 2005-152950 A | 6/2005 |
| JP | 2006-192446 A | 7/2006 |
| JP | 2015-085805 A | 5/2015 |
| KR | 100 991 235 B1 | 11/2010 |

OTHER PUBLICATIONS

Jan. 19, 2017 Extended European Search Report issued in European Patent Application No. 16183969.1.

* cited by examiner

*Primary Examiner* — Teresa M Ekiert
(74) *Attorney, Agent, or Firm* — Oliff PLC

(57) ABSTRACT

A method of making a shaft includes: forming a shaft portion by applying drawing to a first region, of a columnar material made of steel, extending from a predetermined position in an axial direction to an end on a first side in the axial direction, to form a shaft portion, and to form a tapered portion between the shaft portion and a second region, of the columnar material, extending from the predetermined position to an end of the columnar material on a second side in the axial direction, and having an outside diameter increased as the tapered portion extends from the shaft portion side toward the second region side; and forming a head portion by applying plastic forming to the second region and the tapered portion.

5 Claims, 5 Drawing Sheets

FIG.6A
CONVENTIONAL
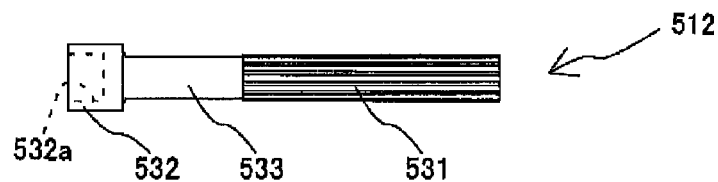
FIG.6B
CONVENTIONAL
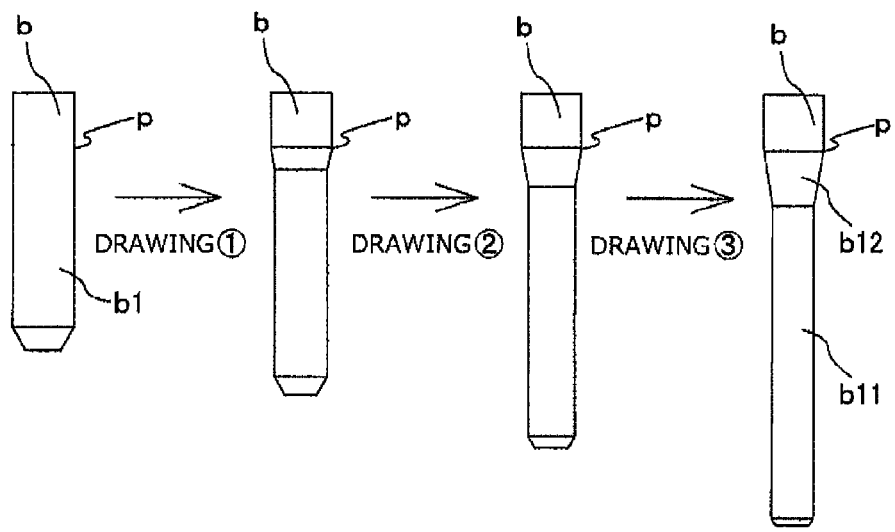
FIG.6C
CONVENTIONAL
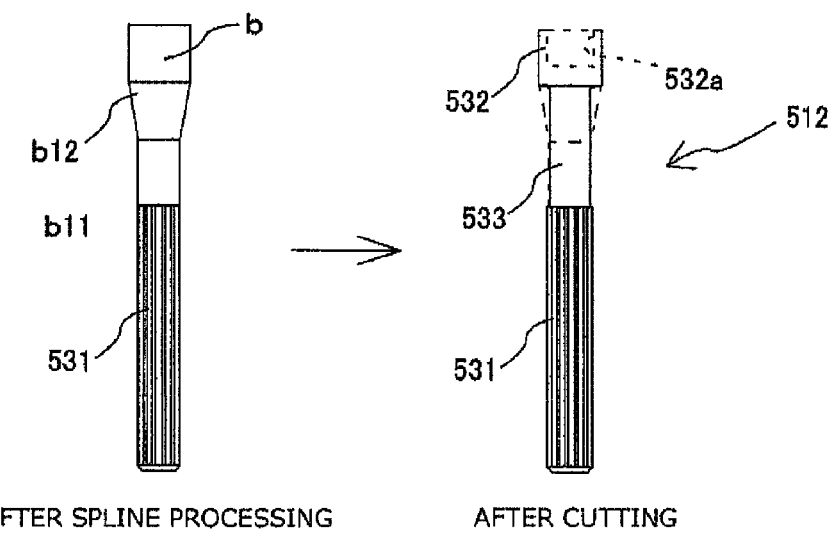

METHOD OF MAKING SHAFT

INCORPORATION BY REFERENCE

The disclosure of Japanese Patent Application No, 2015-162437 filed on Aug. 20, 2015 including the specification, drawings and abstract, is incorporated herein by reference in its entirety.

BACKGROUND OF THE INVENTION

1. Field of the Invention

The present invention relates to a method of making a shaft.

2. Description of the Related Art

A steering shaft that transfers rotation of a steering wheel to steered wheels includes a member having a portion to absorb an excessive torsion load over a predetermined value when the torsion load is applied from the steered wheels side.

Japanese Patent Application Publication No. 2015-85805 (JP 2015-85805 A) describes an electric power steering system in which an intermediate shaft is coupled between an upper shaft coupled to a steering wheel and an input shaft coupled to the steered wheels via other members. The electric power steering system absorbs a torsion load by plastically deforming the intermediate shaft, when a torque that is equal to or higher than a reference value is applied from the steered wheels side.

With reference to FIG. 6A, a conventional intermediate shaft 512 will be described. As shown in FIG. 6A, the intermediate shaft 512 includes a spline portion 531 formed on a first side (right side in FIG. 6A) in an axial direction, a fitted portion 532 formed on a second side (left side in FIG. 6A) in the axial direction, and a neck portion 533 formed between the spline portion 531 and the fitted portion 532.

The spline portion 531 has an external spline formed in its outer periphery. The fitted portion 532 is shaped like a closed-end cylinder and has a concave portion 532a in its end surface. The outside diameter of the fitted portion 532 is larger than a maximum outside diameter of the spline portion 531. The neck portion 533 is a columnar portion having an outside diameter smaller than the outside diameters of the spline portion 531 and the fitted portion 532. When a torsion load over a predetermined value is applied, the intermediate shaft 512 absorbs the torsion load by plastically deforming the neck portion 533 in a torsion direction.

Next, with reference to FIGS. 6B and 6C, a method of making the intermediate shaft 512 will be described. In the first process, as shown in FIG. 6B, drawing is applied to part of a columnar material b having an outside diameter that is equal to the outside diameter of the fitted portion 532, in order to form a rough outer shape of the intermediate shaft 512.

To be specific, the drawing is applied to a first region b1 of the columnar material b extending from a predetermined position p in the axial direction to an end of the columnar material b on a first side in the axial direction. With this, a columnar shaft portion b11 and a tapered portion b12 are formed. The columnar shaft portion b11 extends from the end of the columnar material b on the first side (lower side in FIG. 6B) in the axial direction, toward the second side (upper side in FIG. 6B) of the axial direction. The tapered portion b12 is formed such that the outside diameter of the tapered portion b12 is increased as the tapered portion b12 extends from the shaft portion b11 toward the predetermined position p.

The outside diameter of the shaft portion b11 is equal to a maximum outside diameter of the spline portion 531. The number of times of the drawing is determined depending on a difference between the outside diameter of the columnar material b determined on the basis of the fitted portion 532 and the outside diameter of the spline portion 531. In the method shown in FIG. 6B, the drawing is applied three times.

After the drawing is applied, the columnar material b is subjected to the spline processing, as shown in FIG. 6C. The spline processing is performed on a portion of the shaft portion b11 that is to form the spline portion 531, and is applied to the outer periphery of the portion. Subsequently, cutting is applied to an end face of the columnar material b on the second side in the axial direction to form the concave portion 532a, and is applied to the outer periphery of the tapered portion b12 and the outer periphery of a portion of the shaft portion b11 near the tapered portion b12, to form the columnar neck portion 533. With this, an outer shape of the fitted portion 532 is formed on the second side of the neck portion 533 in the axial direction, and has a diameter larger than that of the neck portion 533.

In the above-described conventional method of making the intermediate shaft 512, one portion of the drawing-applied tapered portion b12, having a smaller outside diameter, has a higher work-hardening degree due to the drawing, and thus has a higher hardness. In contrast, another portion of the drawing-applied tapered portion b12, having a larger outside diameter, has a lower work-hardening degree, and thus has a lower hardness than the portion having the smaller outside diameter. As a result, the neck portion 533 has a large difference in hardness distribution, in the portion formed by the cutting of the outer periphery of the tapered portion b12.

Consequently, when an excessive torsion load over a predetermined value is applied to the conventional intermediate shaft 512, the neck portion 533 is twisted locally at a portion having a lower hardness (i.e. larger outside diameter). Thus, it is difficult to twist the neck portion 533 as a whole in the axial direction. As a result, the conventional intermediate shaft 512 cannot absorb the torsion load sufficiently.

SUMMARY OF THE INVENTION

An object of the present invention is to provide a method of making a shaft that can absorb a torsion load sufficiently.

One aspect of the present invention is a method of making a shaft, the shaft including:
  a columnar shaft portion extending from a first side in an axial direction toward a second side in the axial direction; and
  a head portion formed in a closed-end cylinder, having an outside diameter larger than that of the shaft portion, and having a concave portion that is concave from an end face on the second side in the axial direction toward the first side in the axial direction, an end of the shaft portion on the second side in the axial direction being coupled to a bottom side of the head portion, the shaft being used to couple a first member that holds the shaft portion and a second member that fits into the concave portion,
  the method including:
  forming the shaft portion by applying drawing to a first region, of a columnar material made of steel, extending from a predetermined position in the axial direction to an end on the first side in the axial direction, to form the shaft portion, and to form a tapered portion between the shaft portion and a second region, of the columnar material, extending from the predetermined position to an end of the columnar material on the second side in the axial direction, and having an outside diameter increased as the tapered portion extends from the shaft portion side toward the second region side; and forming the head portion by applying plastic forming to the second region and the tapered portion.

According to the above-described method of making the shaft, in the forming of the shaft portion, the drawing is applied to the first region of the columnar material to form the shaft portion and the tapered portion, and then in the forming of the head portion, the plastic forming is applied to the tapered portion and the second region of the columnar material to form the head portion having a diameter larger than that of the shaft portion. That is, the tapered portion formed through the drawing does not become part of the shaft portion, which is formed through the application of the cutting as in the related art, but becomes part of the head portion, which is formed through the application of the plastic forming. Accordingly, the shaft portion of the present invention can have less difference in the hardness distribution, compared with the case where the tapered portion is subjected to the cutting to become part of the shaft portion. As a result, when a torsion load is applied to the shaft, the shaft can allow torsion to occur across the whole shaft portion, absorbing the torsion load sufficiently.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 6A is a front view of a conventional intermediate shaft;

FIG. 6B is a diagram illustrating a method of making the conventional intermediate shaft, in which processes of the drawing to a columnar material are shown; and FIG. 6C is a diagram illustrating the method of making the conventional intermediate shaft, in which processes of spline processing and cutting to the columnar material are shown.

DETAILED DESCRIPTION OF EMBODIMENTS

Hereinafter, one embodiment to which the present invention is applied will be described with reference to the accompanying drawings. First, a steering system 1 employing a shaft (intermediate shaft 12) made by a method of the present invention will be described with reference to FIG. 1A.

Figure 1A:
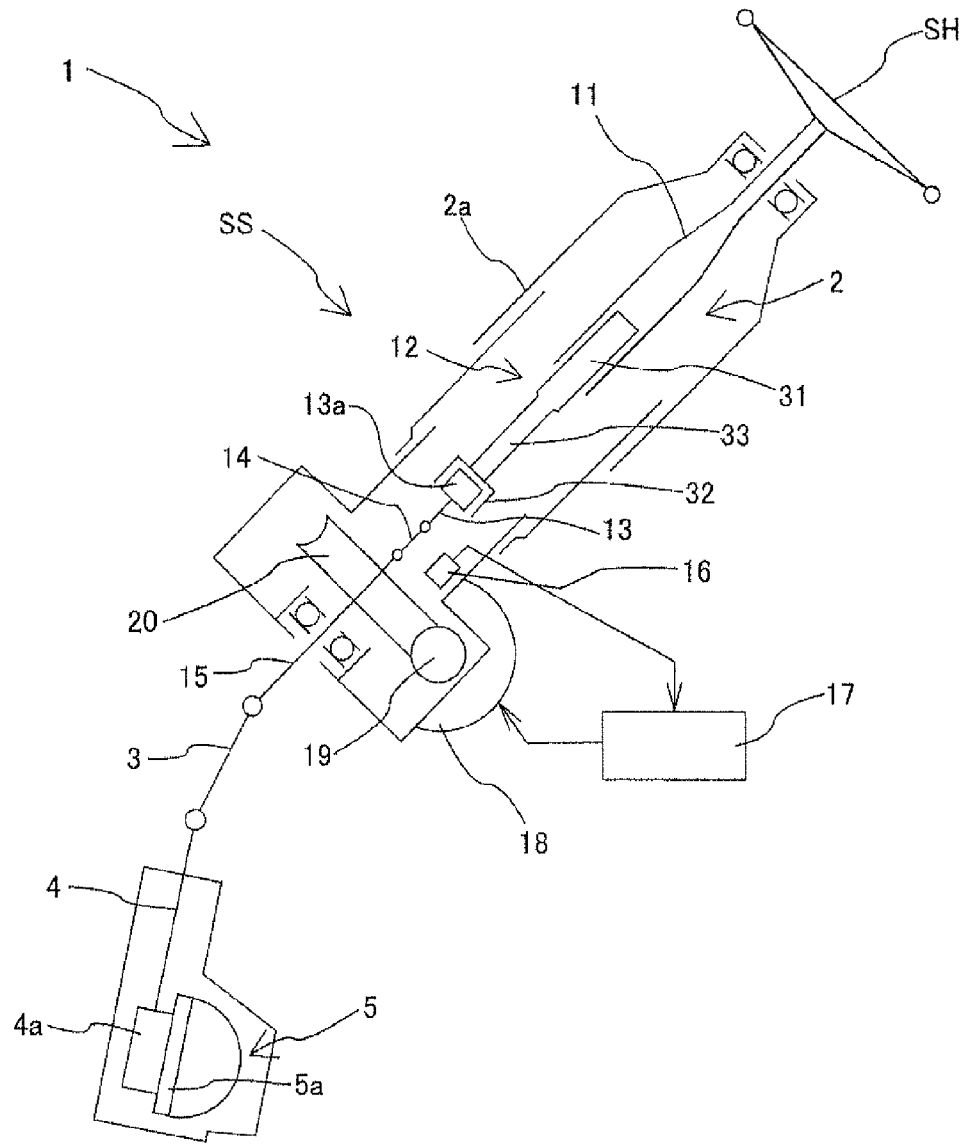
FIG. 1A is a diagram schematically illustrating an electric power steering system employing an intermediate shaft of one embodiment of the present invention.

As shown in FIG. 1A, the steering system 1 includes a steering shaft SS to which a steering wheel SH is coupled. The rotation of the steering wheel SH is transferred to steered wheels (not shown) via the steering shaft SS.

The steering shaft SS includes a steering column shaft 2, an intermediate shaft 3, a pinion shaft 4, and a rack shaft 5. One end of the steering column shaft 2 is coupled to the steering wheel SH. One end of the intermediate shaft 3 is coupled to the other end of the steering column shaft 2 via a universal joint. The other end of the intermediate shaft 3 is coupled to the pinion shaft 4 via a universal joint. The pinion shaft 4 includes a pinion 4a. The rack shaft 5 includes a rack 5a, which is engaged with the pinion 4a, and is coupled to the steered wheels via tie rods (not shown) and knuckle arms (not shown).

When the steering column shaft 2 rotates with the rotation of the steering wheel SH, the rotation of the steering column shaft 2 is transferred to the pinion shaft 4 via the intermediate shaft 3. The rotary motion transferred to the pinion shaft 4 is converted into the linear motion by the engagement of the pinion 4a and the rack 5a, and the linear motion is then transferred to the steered wheels.

Next, the detailed configuration of the steering column shaft 2 will be described. The steering column shaft 2 is arranged in a hollow steering column 2a that is fixed to a vehicle body (not shown), and includes an upper shaft 11, an intermediate shaft 12, an input shaft 13, a torsion bar 14, and an output shaft 15. Around the steering column shaft 2, a torque sensor 16, an electronic control unit (ECU) 17, an electric motor 18, a worm 19, and a worm wheel 20 are provided.

The upper shaft 11 is rotatably supported by the steering column 2a via bearings. A first side of the upper shaft 11 in the axial direction is exposed from the steering column 2a, and is coupled to the steering wheel SH such that the upper shaft 11 can rotate with the steering wheel SH. A second side of the upper shaft 11 in the axial direction is provided with a spline hole 11a that has an internal spline in the inner periphery of the spline hole 11a.

A first side of the intermediate shaft 12 in the axial direction is provided with a spline portion 31 having an external spline in the outer periphery of the spline portion 31. The spline portion 31 can fit into the spline hole 11a of the upper shaft 11. A second side of the intermediate shaft 12 in the axial direction is provided with a fitted portion 32 having a concave portion 32a that is concave toward the first side of the intermediate shaft 12 in the axial direction.

In the steering system 1, when a high torsion load over a predetermined value is applied from the steered wheels side, the intermediate shaft 12 deforms plastically in a torsion direction to absorb the torsion load, preventing the other portions of the steering system 1 from being damaged. The detailed configuration of the intermediate shaft 12 will be described later with reference to FIG. 1B.

One end of the input shaft 13 on a first side in the axial direction is provided with a fitting portion 13a that is capable of fitting into the concave portion 32a of the intermediate shaft 12. In the present embodiment, the outside diameter of the fitting portion 13a is larger than the bore diameter of the concave portion 32a; the fitting portion 13a is pressed into the concave portion 32a to fit into the concave portion 32a; and thus the input shaft 13 is securely coupled to the intermediate shaft 12. Here, the method of fitting the fitting portion 13a into the concave portion 32a is not limited to the press fitting, and may be any of other methods (e.g. shrinkage fitting) that can securely couple the input shaft 13 to the intermediate shaft 12.

A first side of the torsion bar 14 in the axial direction is coupled to a second side of the input shaft 13 in the axial direction. A second side of the torsion bar 14 in the axial direction is coupled to a first side of the output shaft 15 in the axial direction. Thus, when the input shaft 13 and the output shaft 15 rotate relatively to each other, the torsion bar 14 deforms elastically in a torsion direction.

The torque sensor 16 detects a steering torque generated between the input shaft 13 and the output shaft 15, depending on an amount of torsion of the torsion bar 14. The ECU 17 drives and controls the electric motor 18, depending on detection results from the torque sensor 16, the vehicle speed sensor (not shown), and the like.

The worm 19 functions as a driving gear that is driven by the electric motor 18. The worm wheel 20 functions as a driven gear that can be engaged with the worm 19. The worm wheel 20 is coupled to the output shaft 15 such that the worm wheel 20 can rotate with the output shaft 15. The rotation of the electric motor 18 is reduced, in rotational speed, by the worm 19 and the worm wheel 20, and is transferred to the output shaft 15.

The output shaft 15 is rotatably supported by the steering column 2a via bearings. A second side of the output shaft 15 in the axial direction is exposed from the steering column 2a, and is coupled to the intermediate shaft 3.

Figure 1B:
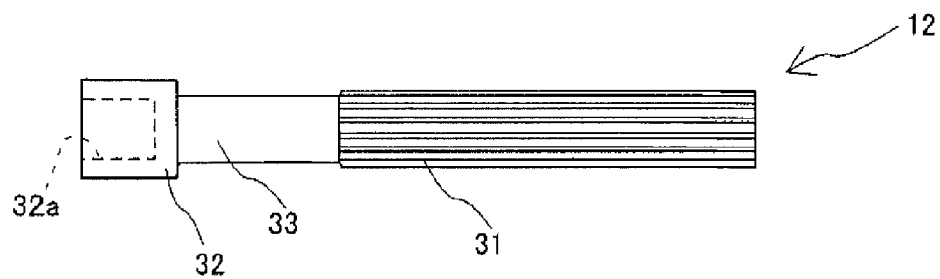
FIG. 1B is a front view of the intermediate shaft.

Next, with reference to FIG. 1B, the configuration of the intermediate shaft 12 will be described. As shown in FIG. 1B, the intermediate shaft 12 includes a spline portion 31, a fitted portion 32, and a neck portion 33.

The spline portion 31 is a substantially columnar portion that extends from an end of the intermediate shaft 12 on a first side (right side in FIG. 1B) in the axial direction, toward a second side (left side in FIG. 1B) thereof in the axial direction. As described above, the spline portion 31 is provided with the external spline that is formed in the outer periphery of the spline portion 31, and that is capable of fitting into the internal spline formed in the spline hole 11a (see FIG. 1A) of the upper shaft 11.

The fitted portion 32 is formed at the end of the intermediate shaft 12 on the second side in the axial direction, and is shaped like a closed-end cylinder. The fitted portion 32 has an outside diameter larger than those of the spline portion 31 and the neck portion 33, and is provided, at the end of the fitted portion 32 on the second side in the axial direction, with the concave portion 32a that is concave from an end face of the fitted portion 32 toward the first side thereof in the axial direction. As described above, the concave portion 32a is a portion into which the fitting portion 13a (see FIG. 1A) of the input shaft 13 is fitted (pressed). The bore diameter of the concave portion 32a of the fitted portion 32 is smaller than the outside diameter of the fitting portion 13a, and the outside diameter of the fitted portion 32 is larger that of the fitting portion 13a.

The neck portion 33 is formed between the spline portion 31 and the fitted portion 32 in the axial direction of the intermediate shaft 12. The outside diameter of the neck portion 33 is smaller than a maximum outside diameter of the spline portion 31 and the outside diameter of the fitted portion 32. The intermediate shaft 12 is structured such that, when a torsion load over a predetermined value is applied to the intermediate shaft 12, the neck portion 33 deforms plastically in a torsion direction.

Moreover, the hardness of the neck portion 33 is lower than that of the fitted portion 32. Thus, in the intermediate shaft 12, the hardness of the fitted portion 21 is higher than that of the neck portion so that the intermediate shaft 12 and the input shaft 13 can be more securely coupled to each other. Furthermore, when a torsion load over a predetermined value is applied to the intermediate shaft 12, the intermediate shaft 12 allows the neck portion 33 to reliably deform plastically to absorb the torsion load sufficiently.

Next, with reference to FIGS. 2 to 4, processes of making the intermediate shaft 12 will be described. In the present embodiment, drawing and plastic forming are applied to a steel-made columnar material B to form a rough outer shape of the intermediate shaft 12, and then cutting and spline processing are applied to the rough outer shape of the intermediate shaft 12 to complete the intermediate shaft 12.

At first, a rough outer shape of the spline portion 31 and the neck portion 33 is formed (shaft portion formation process). In this process, the drawing is applied to a first region B1 of the columnar material B extending from a predetermined position P to an end of the columnar material B on a first side (lower side in FIG. 2A) in the axial direction, and thereby a columnar shaft portion B11 having a reduced outside diameter is formed. The shaft portion B11 is a portion to become the spline portion 31 and the neck portion 33 (see FIG. 1B) through the following processes. The outside diameter of the shaft portion B11 is determined, depending on a maximum outside diameter of the spline portion 31. The outside diameter D0 of the columnar material B is smaller than the outside diameter of the fitted portion 32 (see FIG. 1B), and is larger than a maximum outside diameter of the spline portion 31 and the outside diameter of the neck portion 33.

Figure 2A:
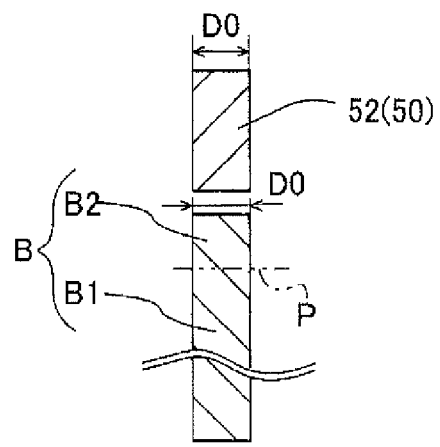
FIG. 2A is a diagram illustrating a method of making the intermediate shaft, in which drawing is still not applied to a columnar material.

As shown in FIG. 2A, a drawing die 50 mainly includes a die 51 having a cavity 53 in which the columnar material B is to be placed, and a punch 52 disposed to face the cavity 53. The cavity 53 includes a first portion 53a formed on one surface side of the die 51 and in which the punch 52 is to be placed, a second portion 53b provided adjacent to the first portion 53a, and a third portion 53c provided adjacent to the second portion 53b.

The first portion 53a is a cylindrical inner periphery having a bore diameter D0 that corresponds to the outside diameter D0 of the columnar material B. The second portion 53b is a tapered inner periphery whose bore diameter is decreased as the inner periphery is tapered from the first portion 53a side to the third portion 53c side (i.e. from upper side to lower side in FIG. 2A). The third portion 53c is a cylindrical inner periphery having a bore diameter D1 that corresponds to the outside diameter of the shaft portion B11. The bore diameter D1 of the third portion 53c is smaller than the bore diameter D0 of the first portion 53a. The punch 52 is supported such that the punch 52 can move back and forth in a direction in which the punch 52 moves toward and away from the die 51 (i.e. upper and lower direction in FIG. 2A).

Figure 2B:
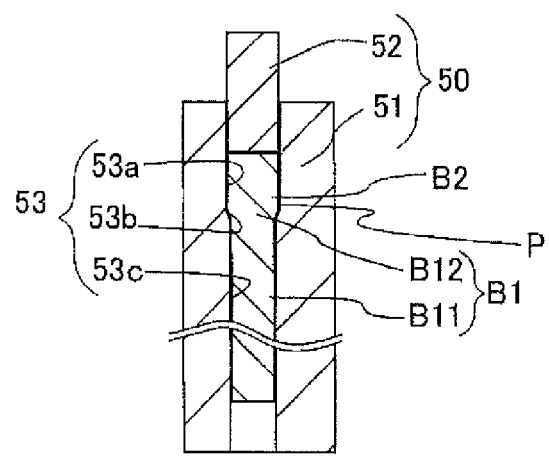
FIG. 2B is a diagram illustrating the method of making the intermediate shaft, in which the drawing has been applied to the columnar material.

As shown in FIG. 2B, in the shaft portion formation process, the columnar material B is placed in the cavity 53, and then the punch 52 is moved in the direction in which the punch 52 approaches the die 51 (i.e. lower direction in FIG. 2B) to push the columnar material B until the predetermined position P reaches the border between the first portion 53a and the second portion 53b. With this, the drawing is applied to the first region B1 of the columnar material B. A portion that was the first region B1 before the drawing deforms plastically into a shape that corresponds to the second portion 53b and the third portion 53c. At this time, the drawing is not applied to a portion (i.e. second region B2 described later) of the columnar material B that is placed in the first portion 53a.

The columnar material B formed through the application of the drawing in this manner includes the columnar shaft portion B11 and a tapered portion B12. The shaft portion B11 extends from the end of the columnar material B on the first side (lower side in FIG. 2B) in the axial direction, toward the second side (upper side in FIG. 2B) of the columnar material B in the axial direction. The tapered portion B12 has an outside diameter increased as the tapered portion B12 extends from the shaft portion B11 toward the predetermined position P.

Next, a rough outer shape of the fitted portion 32 is formed (head formation process). In this process, the plastic forming is applied to the tapered portion B12 and the second region B2 extending from the predetermined position P to the end of the columnar material B on the second side in the axial direction. Through this process, a head portion B22 is formed at the end of the columnar material B on the second side in the axial direction. The head portion B22 is a portion to become the fitted portion 32 (see FIG. 1B) through the following process.

In the present embodiment, the plastic forming of the head formation process is performed as follows: upsetting is applied to the tapered portion B12 and the second region B2 to form the columnar portion B21 having an outside diameter that corresponds to the outside diameter of the fitted portion 32; and then extruding is applied to the columnar portion B21 to form the head portion B22 having the concave portion 32a.

Figure 3A:
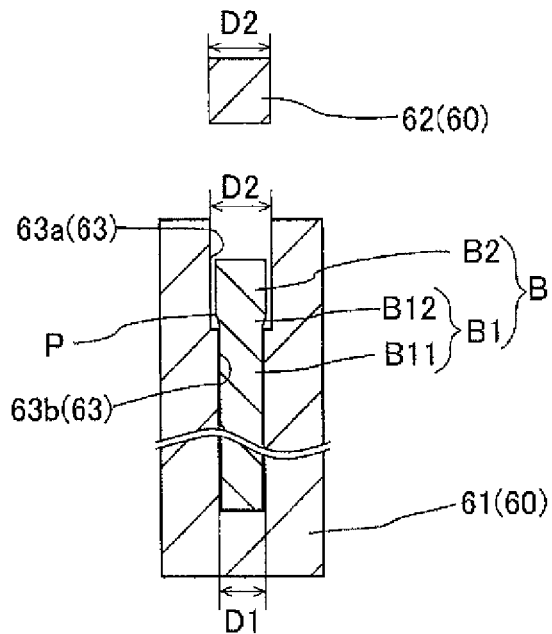
FIG. 3A is a diagram illustrating the method of making the intermediate shaft, in which upsetting is still not applied to the columnar material.

As shown in FIG. 3A, an upsetting die 60 mainly includes a die 61 having a cavity 63 in which the columnar material B is to be placed, and a punch 62 disposed to face the cavity 63. The cavity 63 includes a first portion 63a formed on one surface side of the die 61 and in which the punch 62 is to be placed, and a second portion 63b provided adjacent to the first portion 63a. The first portion 63a is a cylindrical inner periphery having a bore diameter D2 larger than the outside diameter of the second region B2 of the columnar material B. The second portion 63b is a cylindrical inner periphery that has a bore diameter D1 and that is formed on the basis of the shape of the shaft portion B11. The punch 62 is a columnar member that is supported such that the punch 62 can move back and forth in a direction in which the punch 62 moves toward and away from the die 61 (i.e. upper and lower direction in FIG. 3A). The punch 62 has an outside diameter D2 that corresponds to the bore diameter D2 of the first portion 63a of the die 61. The capacity of the first portion 63a is determined, depending on the volume of the second region B2 and the volume of the tapered portion B12.

Figure 3B:
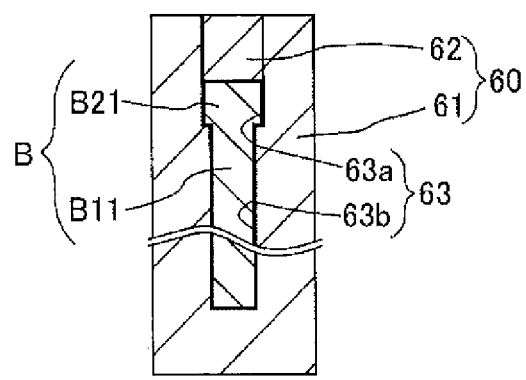
FIG. 3B is a diagram illustrating the method of making the intermediate shaft, in which the upsetting has been applied to the columnar material.

As shown in FIG. 3B, the upsetting of the head formation process is performed as follows: the shaft portion B11 is placed in the second portion 63b of the cavity 63; the tapered portion B12 and the second region B2 are placed in the first portion 63a; and the punch 62 is then moved toward the die 61 (i.e. lower direction in FIG. 3B) and pushed into the cavity 63. With this, the upsetting is applied to the tapered portion B12 and the second region B2, and thus portions that were the tapered portion B12 and the second region B2 respectively before the upsetting deform plastically into a cylindrical shape having an outside diameter of D2.

The columnar material B formed through the application of the upsetting in this manner includes a columnar portion B21 on the second side (upper side in FIG. 3B) in the axial direction of the shaft portion B11. The columnar portion B21 has an outside diameter larger than those of the shaft portion B11 and the second region B2 before the upsetting is applied. The outside diameter of the columnar portion B21 is equal to the outside diameter of the fitted portion 32 (see FIG. 1B). The axial length of the columnar portion B21 is smaller than that of the fitted portion 32.

Figure 4A:
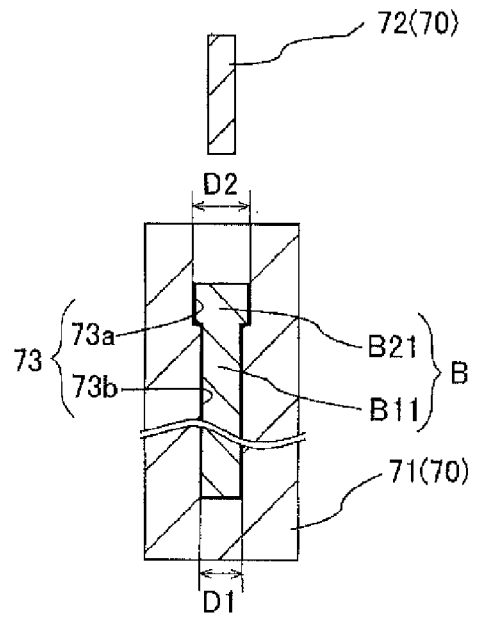
FIG. 4A is a diagram illustrating the method of making the intermediate shaft, in which extruding is still not applied to the columnar material.

As shown in FIG. 4A, an extruding die 70 includes a die 71 having a cavity 73 in which the columnar material B is to be placed, and a punch 72 disposed to face the cavity 73. The cavity 73 includes a first portion 73a formed on one surface side of the die 71 and in which the punch 72 is to be placed, and a second portion 73b provided adjacent to the first portion 73a.

The first portion 73a is a cylindrical inner periphery having a bore diameter D2 that corresponds to the outside diameter of the columnar portion B21 (i.e. the outside diameter of the fitted portion 32 shown in FIG. 1B). The second portion 73b is a cylindrical inner periphery having a bore diameter D1 that corresponds to the outside diameter of the shaft portion B11.

The punch 72 is supported such that the punch 72 can move back and forth in a direction in which the punch 72 moves toward and away from the die 71 (i.e. upper and lower direction in FIG. 4A) in a state where the punch 72 and the cavity 73 have a common axis. The punch 72 has an outside diameter that is smaller than the bore diameter of the first portion 73a, and that corresponds to the bore diameter of the concave portion 32a (see FIG. 1B).

Figure 4B:
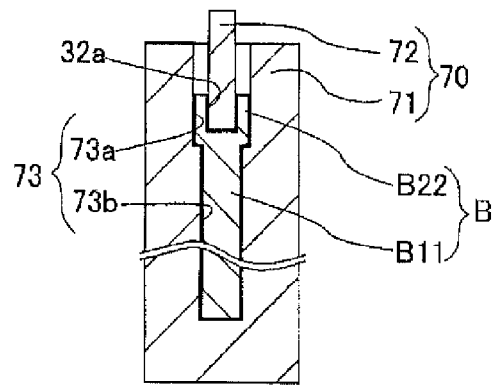
FIG. 4B is a diagram illustrating the method of making the intermediate shaft, in which the extruding has been applied to the columnar material.

As shown in FIG. 4B, in the extruding of the head formation process, the columnar material B is placed in the cavity 73, and then the punch 72 is inserted in the first portion 73a to press the end face of the columnar portion B21 on the second side in the axial direction. With this, the extruding is applied to the columnar portion B21, and a portion that was the columnar portion B21 before the extruding is provided with the concave portion 32a formed in a portion that has been pressed with the punch 72. At this time, part of the steel of the columnar portion B21 is forced to extend toward the second side (upward in FIG. 4B) of the columnar material B in the axial direction, through a space between the outer periphery of the punch 72 and the first portion 73a.

The columnar material 13 formed through the application of the extruding in this manner is provided with the head portion B22 having the concave portion 32a, on the second side (upper side in FIG. 4B) of the shaft portion B11 in the axial direction. The outside diameter and the axial length of the head portion B22 are the same as those of the fitted portion 32.

Next, the cutting and the spline processing are applied to the columnar material B that has a rough shape of the intermediate shaft 12, which is formed through the shaft portion formation process and the head formation process. The cutting process and the spline formation process are not shown in the figures, but will be described with reference to FIGS. 1B and 4B, as appropriate.

The cutting is applied to both of the head portion B22 and the shaft portion B11. The cutting for the head portion B22 removes burrs formed on the end face of the head portion B22 on the second side (upper side in FIG. 4B) in the axial direction, due to the extruding of the head formation process, and thus forms the fitted portion 32. The cutting for the shaft portion B11 cuts a predetermined region of the shaft portion B11 on the second side (i.e. neck portion 33 side) in the axial direction to reduce the outside diameter of the predetermined region, and thus forms the neck portion 33. Since the neck portion 33 has an outside diameter smaller than that of the spline portion 31 through the cutting, the rigidity of the neck portion 33 becomes lower than that of the spline portion 31. Thus, when a torsion load over a predetermined value is applied to the intermediate shaft 12, the intermediate shaft 12 can plastically deform the neck portion 33, restricting the plastic deformation of the spline portion 31.

The spline processing is performed on a portion of the shaft portion B11 on the first side thereof (lower side in FIG. 4B) in the axial direction, where the neck portion 33 is not formed; that is, the spline processing is applied to the outer periphery of the portion to form the spline portion 31.

Figure 5:
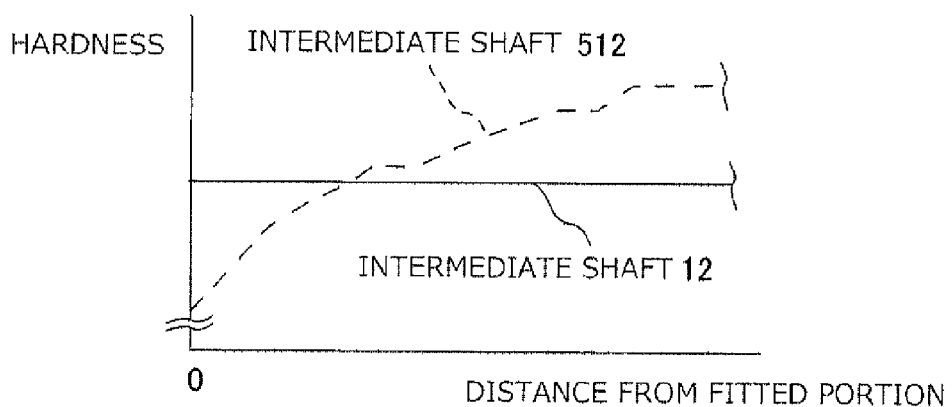
FIG. 5 is a graph showing a measurement result of the hardness of neck portions.

Here, with reference to FIG. 5, a relationship between the intermediate shaft 12 and its making process will be described on the basis of a measurement result of the hardness of the neck portion 33. FIG. 5 shows a graph illustrating the measurement result of the hardness of the neck portion 33 of the intermediate shaft 12 made by the making method of the present embodiment, and also illustrating a measurement result of the hardness of the neck portion 533 of the intermediate shaft 512 (see FIGS. 6A, 6B, and 6C) made by the conventional making method. In this graph, the vertical axis represents the hardness and the horizontal axis represents the distance from the fitted portions 32 and 532.

From the graph shown in FIG. 5, it can be seen that the conventional intermediate shaft 512 has a lower hardness in a portion near the fitted portion 532, and has a higher hardness in a portion away from the fitted portion 532. It is assumed that the result is caused by the conventional making method that applies the cutting to the tapered portion b12 to form a part of the neck portion 533.

To be specific, since the shaft portion b11 is formed by reducing the diameter of the columnar material b through the drawing, the cross-sectional area of the tapered portion b12 is reduced significantly from the cross-sectional area of the tapered portion b12 before the drawing is applied as the tapered portion b12 is tapered toward the shaft portion b11, and the work-hardening degree of the tapered portion b12 is increased with the reduction in the cross-sectional area. On the other hand, the reduction in the cross-sectional area of a portion of the tapered portion b12 near the fitted portion 532 from the cross-sectional area of the tapered portion b12 before the drawing is applied is small, and the work-hardening degree of the portion is small. Thus, it can be thought that a portion of the neck portion 533 formed by the cutting of the tapered portion b12 has a higher hardness in a position near the shaft portion b11 and a lower hardness in a position near the fitted portion 532.

In contrast to this, it can be seen from the graph that the neck portion 33 of the intermediate shaft 12 of the present embodiment has less difference in the hardness distribution as a whole in the axial direction. In the making method of the present embodiment, the tapered portion B12 is plastically deformed to become part of the head portion B22, and part of the shaft portion B11 is subjected to the cutting to complete the shaft portion B11. Thus, it can be thought that since the shaft portion B11 is formed into a cylinder having a uniform outside diameter through the drawing, and since the work-hardening degree of the shaft portion B11 is uniform as a whole in the axial direction, the neck portion 33 can have less difference in the hardness distribution in the axial direction.

In addition, it can be seen from the graph of FIG. 5 that the conventional intermediate shaft 512 has a higher hardness in a portion of the neck portion 533 that is away from the fitted portion 532, by a certain distance or more, toward the first side of the intermediate shaft 512 in the axial direction, compared with the hardness of the neck portion 33 of the intermediate shaft 12 of the present invention.

It is assumed that the result is caused by the conventional making method that makes the outside diameter of the columnar material b equal to the outside diameter of the fitted portion 532, and that makes the difference in dimension between the outside diameter of the columnar material b and the outside diameter of the shaft portion b11 large.

To be specific, since the drawing of the shaft portion formation process has a limitation that determines an amount by which one-time drawing can reduce the diameter of a columnar material, the conventional making method needs the drawing to be applied to the first region b1 three times. Thus, it can be thought that the portion (i.e. shaft portion b11, and the portion of the tapered portion b12 adjacent to the shaft portion b11) formed by the three times of the drawing is increasingly work-hardened, thereby the hardness of the neck portion 33 is excessively increased.

In contrast to this, the making method of the present embodiment is performed as follows: the shaft portion formation process applies the drawing only to the first region B1 of the columnar material B to form the shaft portion B11 and the tapered portion B12, without applying the drawing to the second region B2 (see FIG. 2B); and the head formation process applies the plastic forming to the tapered portion B12 and the second region B2 to form the head portion B22, without applying the plastic forming to the shaft portion B11 (see FIG. 3B).

In other words, the shaft portion B11 formed by the drawing of the shaft portion formation process is not subjected to the plastic forming of the head formation process performed after the shaft portion formation process, and thus is not subjected to work-hardening caused by the plastic forming. On the other hand, the head portion B22 formed by the plastic forming of the head formation process is not subjected to the drawing of the shaft portion formation process performed before the head formation process, and thus is not subjected to work-hardening caused by the drawing. In this manner, the shaft portion B11 and the head portion B22 can have their own hardness, independently of each other. It is accordingly possible to set appropriate hardness to each of the portions of the intermediate shaft 12, depending on an intended use.

Preferably, the hardness of the neck portion 33 is determined so that the neck portion 33 is twisted when a torsion load over a predetermined value is applied. The hardness of the fitted portion 32 is preferably increased to achieve a high degree of fitting between the concave portion 32a and the fitting portion 13a of the input shaft 13 (see FIG. 1A).

As to this, in the making method of the present embodiment, the outside diameter of the columnar material B is smaller than the outside diameter of the fitted portion 32 (i.e. outside diameter of the head portion B22) and larger than the outside diameter of the spline portion 31 (i.e. maximum outside diameter of the shaft portion B11), and the hardness and the outside diameter of the columnar material B is determined so that the hardness of the shaft portion B11 work-hardened by one-time drawing becomes a most appropriate hardness for the neck portion 33. With this, the hardness of the neck portion 33 of the intermediate shaft 12 can be adjusted so that the neck portion 33 has an appropriate rigidity. The hardness of the fitted portion 32, on the other hand, can be adjusted so that the fitted portion 32 (head portion B22) has an appropriate hardness through the work-hardening caused by the plastic forming.

Thus, in the intermediate shaft 12 made by the making method of the present embodiment, it is possible to appropriately set the hardness of the fitted portion 32 and the neck portion 33, and to reduce the difference in the hardness distribution of the neck portion 33. As a result, when a torsion load over a predetermined value is applied, the intermediate shaft 12 can be twisted as a whole in the axial direction to absorb the torsion load sufficiently.

The present invention has been described on the basis of the above embodiment, but is not limited thereto in any way.

For example, although the present embodiment has been described on the case where the drawing is applied one time in the shaft portion formation process, the drawing may be applied two or more times for appropriately adjusting the hardness of the neck portion 33. In addition, although the present embodiment has been described on the case where the columnar material has the outside diameter D0 smaller than the outside diameter D2 of the fitted portion 32 and where the application of the plastic forming increases the outside diameter of the second region B2, the columnar material may have an outside diameter equal to the outside diameter of the fitted portion 32, and the application of the upsetting may plastically deform the tapered portion B12 into a part of the columnar portion B21 to complete the columnar portion B21 having the outside diameter D2 equal to that of the fitted portion 32. This can reduce the hardness of the head portion B22, while increasing the hardness of the shaft portion B11.

Thus, since the method of making the intermediate shaft 12 according to the present embodiment can easily adjust the hardness of the shaft portion B11 and the hardness of the head portion B22, it can improve the flexibility for designing the intermediate shaft 12.

Furthermore, although the present embodiment has been described on the case where the upsetting and the extruding are performed as the plastic forming of the head formation process, the present embodiment is not necessarily limited to this. For example, the upsetting may be omitted, and only the extruding may be performed to form the head portion B22.

The function to absorb the torsion load is not limited to the function given to the intermediate shaft 12 as in the present embodiment. The same aspect as that of the intermediate shaft 12 may be applied to any member of the steering shaft SS, which is a rigid body and normally transfers torque. That is, the same aspect may be applied to any of the upper shaft 11, the input shaft 13, the output shaft 15, the intermediate shaft 3, and the pinion shaft.

The effect of the present invention will be described. The present invention relates to a method of making a shaft. The shaft includes: a columnar shaft portion B11 extending from a first side in an axial direction toward a second side in the axial direction; and a head portion B22 formed in a closed-end cylinder, having an outside diameter larger than that of the shaft portion B11, and having a concave portion 32a that is concave from an end face on the second side in the axial direction toward the first side in the axial direction. An end of the shaft portion B11 on the second side in the axial direction is coupled to a bottom side of the head portion. The shaft is used to couple a first member that holds the shaft portion B11 and a second member that fits into the concave portion 32a. The method includes: forming the shaft portion by applying drawing to a first region B1, of a columnar material B made of steel, extending from a predetermined position P in the axial direction to an end on the first side in the axial direction, to form the shaft portion B11, and to form a tapered portion B12 between the shaft portion B11 and a second region 112, of the columnar material B, extending from the predetermined position P to an end of the columnar material B on the second side in the axial direction, and having an outside diameter increased as the tapered portion B12 extends from the shaft portion B11 side toward the second region B2 side; and forming the head portion B22 by applying plastic forming to the second region B2 and the tapered portion B12.

According to the above-described method of making the shaft, the forming of the shaft portion applies the drawing to the first region B1 of the columnar material B to form the shaft portion B11 and the tapered portion B12, and then the forming of the head portion applies the plastic forming to the tapered portion B12 and the second region B2 of the columnar material B to form the head portion B22 having a diameter larger than that of the shaft portion B11.

That is, the tapered portion B12 formed through the drawing does not become part of the shaft portion b11, which is formed through the application of the cutting as in the related art, but becomes part of the head portion B22, which is formed through the application of the plastic forming. Accordingly, the shaft portion B11 of the present invention can have less difference in the hardness distribution, compared with the case where the tapered portion B12 is subjected to the cutting to become part of the shaft portion B11. As a result, when a torsion load is applied to the shaft, the shaft can allow torsion to occur across the whole shaft portion B11, absorbing the torsion load sufficiently.

Furthermore, in the above-described method of making the shaft, the columnar material B has an outside diameter smaller than the outside diameter of the head portion B22 and larger than the outside diameter of the shaft portion B11; and the forming of the head portion applies plastic forming to the second region B2 and the tapered portion B12 to increase diameters of the second region B2 and the tapered portion B12 for forming the head portion B22.

According to the method of making the shaft, since the difference between the outside diameter of the columnar material B and the outside diameter of the shaft portion B11 can be reduced, the number of times of the drawing required in the shaft portion formation process can be decreased. This can prevent the hardness of the shaft portion B11 from being excessively increased due to work-hardening caused by the drawing.

Furthermore, in the above-described method of making the shaft, the forming of the head portion includes: upsetting the second region B2 and the tapered portion B12, as the plastic forming, to form the columnar portion B21 having a diameter larger than that of the shaft portion B11; and extruding the columnar portion B21, as the plastic forming, to form the head portion B22.

According to the method of making the shaft, it is possible to reduce the burrs created through the plastic forming, compared with a case, for example, where the upsetting is omitted and only the extruding is applied to form the head portion B22. This can shorten the time required to remove the burrs, thus shortening the time required to make the shaft.

Furthermore, as to the above-described method of making the shaft, in the forming of the shaft portion, the shaft portion B11 is formed by one-time drawing. According to the method of making the shaft, it is possible to prevent the hardness of the shaft portion B11 from being excessively increased due to work-hardening caused by the drawing. As a result, when a torsion load over a predetermined value is applied to the shaft, the shaft can easily allow torsion to occur across the shaft portion B11, absorbing the torsion load sufficiently.

Furthermore, in the above-described method of making the shaft, the shaft is one part of the steering shaft SS of the steering system. According to the method of making the shaft, when a torsion load over a predetermined value is applied, the steering shaft SS of the steering system 1 can absorb the torsion load sufficiently, by causing the shaft portion B11 to deform plastically in a torsion direction.

What is claimed is:

1. A method of making a shaft, the method comprising:
    applying drawing to a first region of a columnar material made of steel, the columnar material having an initial diameter prior to applying drawing to the first region and includes the first region and a second region with the first region extending from the second region to a first end on a first side of the columnar material in the axial direction and the second region extending from the first region to a second end of the columnar material on a second side of the columnar material in the axial direction, to form:
        (1) a columnar shaft portion having a diameter smaller than the initial diameter and extending from the first side in an axial direction toward the second side in the axial direction, and
        (2) a tapered portion extending between the columnar shaft portion and the second region, the tapered portion having an outside diameter that increases as the tapered portion extends from the columnar shaft portion toward the second region; and
    applying plastic forming to the second region and the tapered portion to increase a diameter of the second region from the initial diameter to form a head portion so that the head portion forms a closed-end cylinder having an outside diameter larger than that of the initial diameter and so that an end of the columnar shaft portion on the second side in the axial direction is coupled to a bottom side of the head portion, the shaft being used to couple a first member that holds the columnar shaft portion and a second member that mates with the head portion; and
        pressing the columnar shaft portion with a punch having a diameter that is smaller than the outside diameter of the columnar shaft portion to form a concave portion that is concave and extends from an end face on the second side in the axial direction toward the first side in the axial direction.

2. The method of making a shaft, according to claim 1, wherein,
    the applying plastic forming to the second region and the tapered portion comprises:
        upsetting the second region and the tapered portion to form a columnar part having a diameter larger than that of the columnar shaft portion; and
        extruding the columnar part to form the head portion.

3. The method of making a shaft, according to claim 1, wherein,
    the drawing is performed only one time.

4. The method of making a shaft, according to claim 1, wherein, the shaft is a part of a steering shaft of a steering system.

5. A method of making a shaft, the method comprising:
    applying drawing to a first region of a columnar material made of steel, the columnar material having an initial diameter prior to applying drawing to the first region and includes the first region and a second region with the first region extending from the second region to a first end on a first side of the columnar material in the axial direction and the second region extending from the first region to a second end of the columnar material on a second side of the columnar material in the axial direction, to form:
        (1) a columnar shaft portion having a diameter smaller than the initial diameter and extending from the first side in an axial direction toward the second side in the axial direction, and
        (2) a tapered portion extending between the columnar shaft portion and the second region, the tapered portion having an outside diameter that increases as the tapered portion extends from the columnar shaft portion toward the second region; and
    applying plastic forming to the second region and the tapered portion to increase a diameter of the second region from the initial diameter to form a head portion so that the head portion forms a closed-end cylinder having an outside diameter larger than that of the initial diameter and so that an end of the columnar shaft portion on the second side in the axial direction is coupled to a bottom side of the head portion, the shaft being used to couple a first member that holds the columnar shaft portion and a second member that mates with the head portion, wherein
    the applying plastic forming to the second region and the tapered portion comprises:
        upsetting the second region and the tapered portion to form a columnar part having a diameter larger than that of the columnar shaft portion; and
        extruding the columnar part to form the head portion.

* * * * *